United States Patent [19]

González

[11] 4,328,873
[45] May 11, 1982

[54] AUTOMATIC DEPTH COMPENSATING SYSTEM FOR DRILL BIT LUBRICATION

[76] Inventor: Eduardo B. González, Ave. Universidad Num. 482, Mexico 13, D.F., Mexico

[21] Appl. No.: 153,682

[22] Filed: May 27, 1980

[51] Int. Cl.³ ............................................. E21B 10/24
[52] U.S. Cl. .................................................... 175/228
[58] Field of Search ......................................... 175/228

[56] References Cited

U.S. PATENT DOCUMENTS

| | | | |
|---|---|---|---|
| 3,244,459 | 4/1966 | Ortloff | 308/8.2 |
| 3,303,898 | 2/1967 | Bercaru | 175/228 |
| 3,844,364 | 10/1974 | Crow | 175/228 |
| 3,866,695 | 2/1975 | Jackson | 175/228 |
| 4,154,312 | 5/1979 | Barnetche | 175/228 |
| 4,254,838 | 3/1981 | Barnetche | 175/228 |

*Primary Examiner*—Ernest R. Purser
*Attorney, Agent, or Firm*—Armstrong, Nikaido, Marmelstein & Kubovcik

[57] ABSTRACT

An automatic depth compensating system is provided for controlling the pressure in a volume such as the interior of a rotary drill bit in response to pressure changes in the environment adjacent to the volume. The system comprises at least one pressure compensating device positioned between the volume and the environment for changing the pressure in the volume in response to pressure changes in the environment. The system further includes a pressure surge compensating device which is positioned between the volume and the environment for compensating for positive and negative pressure surges when the pressure in the volume changes relative to the pressure in the environment. The pressure compensating devices each comprises differential piston devices having a spring for biasing the differential piston and the pressure surge compensating device comprises a cylinder, a piston positioned in the cylinder and forming a chamber therein and first and second check valves for opening in response to predetermined pressure differentials between the environment and the interior of the volume.

18 Claims, 5 Drawing Figures

AUTOMATIC DEPTH COMPENSATING SYSTEM FOR DRILL BIT LUBRICATION

BACKGROUND OF THE INVENTION

1. Field of the Invention

The present invention is related to an automatic depth compensating system and the incorporation of the automatic depth compensating system as an improvement in a rotary drill bit and more particularly, to an automatic depth compensating system which has at least one pressure compensating device for changing the pressure in the interior of a volume in response to pressure changes in the environment surrounding the volume and a pressure surge compensating device which compensates for positive and negative pressure surges when the pressure within the volume changes is relative to the environment. Furthermore, the present invention is more particularly directed to a rotary drill bit which includes the improvement of this type of automatic depth compensating system.

2. Description of the Prior Art

In all rotary drills used in the drilling of wells in the ground as well as many other types of devices used in wells which are either drilled or being drilled, there is a need to protect the inner working parts of the drill and devices from pressure and from the environment in which the drill device is working as the environment is often very aggressive or damaging. The need for protection is most critical at points where there is relative movement between different parts of the device. Typically, problems of this type occur in the movement of drilling cones of tricone drill bits and in the movement of a single cutting head relative to the drill bit body as in the Barnetche drill bit such as that shown in U.S. Pat. No. 4,154,312. The problem with regard to protection also exists in devices other than drill bits as, for example, in downhole motors, downhole pumps, etc.

In devices such as those noted above, since there is movement between parts, there is also a need for bearings of some type. The bearings in turn require a clean self-contained lubrication system and the fact that the relative movement occurs between different parts of these devices creates a need for a seal between the separately moving parts which will isolate the internal lubrication system from the downhole environment. It is these seals which are usually the most vulnerable elements in the devices. In actual drilling, these are a number of adverse factors which exist simultaneously. Furthermore, many of these conditions exist in the downhole environment even after drilling is completed and thus have an impact on other types of downhole devices as well as drills.

One factor contributing to the performance requirement for seals on downhole devices is pressure. Due to the need for circulation of drilling fluids or mud which are commonly employed in rotary drilling of deep wells, the pressure on devices at the bottom of the well are extreme. If the internal pressure of the self-contained lubrication system of the downhole device were to be at atmospheric pressure the seals on the device would be required to withstand tremendous differential pressures since the downhole pressure of the environment is very high. Further, the environment at the bottom of the hole is extremely aggressive or damaging due to the presence of drilling fluid, mud, additives, drill cuttings, etc. The environment, thus, would produce a very erosive action on the seals. Failure of the seals under the large differential pressure load will result in leakage of the aggressive downhole element through the seal and into the device itself, producing rapid deterioration and failure of the internal components, such as the bearings.

In order to provide compensation for the extreme downhole pressures and to reduce the damaging effect of the aggressive environment on the seals, pressure compensators have been used. An example of a pressure compensator can be found in U.S. Pat. No. 4,154,312 which is directed to the Barnetche bit, this patent being incorporated herein by reference. In the pressure compensator disclosed in this patent, a diaphragm is positioned between the interior and exterior of the downhole device in order to equalize the pressure between the volume inside the drill bit and the environment. In the prior art a simple piston in a cylinder has been used instead of the bellows. This type of pressure compensator reduces the pressure differential to 0. However, pressure compensators such as that disclosed in the Barnetche bit patent, have the disadvantage that at best, they produce equal pressure between the inside of the drill bit and the environment. Furthermore, generally due to hysteresis and viscosity of internal lubricants, the internal pressure is less than the external pressure. This means that at the seal in the case of the differential pressure being 0, the seal tends to dry out since no lubricant is added to the seal faces. In the case of negative internal pressure even though it is small, there will be a small amount of leakage in which the aggressive external environment will enter the seal faces thereby accelerating seal wear. Furthermore, the harmful elements of this aggressive environment will also have a damaging effect on the internal parts of the drill bit such as the bearings.

A drill bit lubrication system using a differential piston is shown in U.S. Pat. No. 3,244,459. The differential piston includes a cylinder of two different diameters with a piston having different diameters in each of the portions of the cylinder. This type of differential piston will provide an internal pressure greater than the external pressure and in fact, the internal pressure will always be a predetermined percentage greater than the external pressure. The differential piston device of Ortloff, however, has two significant disadvantages. First, since the internal pressure is a predetermined percentage greater than the external pressure, at extreme operating pressures which are often found in well drilling such as the type with which it is used, although the percentage may be small, the absolute pressure differential between the internal and external pressure is very large. This large pressure differential cannot be maintained by the seals and the lubricant within the interior of the drill bit is forced through the seal to the exterior and eventually there is not sufficient lubricant to provide the required lubrication for the drill bit. In other words, the drilling depth is limited when using a differential piston device such as that shown in Ortloff. Another significant disadvantage in the device of Ortloff, is that because of the large number of seals required between the piston and cylinder, there is large static friction which must be overcome before there is movement of the piston. The piston does not react to pressure surges unless they are very high and, thus, there can be a leaking of the seals during the periods of pressure surge.

SUMMARY OF THE INVENTION

It is the primary object of the present invention to provide an automatic depth compensating seal lubricating system which will provide control of the flow of lubricant from the interior to the exterior of a downhole device under extreme pressure conditions and which will compensate for both positive and negative pressure surges.

It is another primary object of the present invention to provide an improvement to a Barnetche bit in the way of an automatic depth compensating seal lubricator system to control the flow of lubricant from the interior of the Barnetche bit to the exterior thereof under extreme pressure conditions and to compensate for positive and negative pressure surges.

It is another object of the present invention to provide an automatic depth compensating system for maintaining the pressure within a volume greater than the pressure in the environment adjacent to the volume.

It is a further object of the present invention to provide an automatic depth compensating system in which a spring is used in combination with a differential piston depth compensator to bias the differential piston in order to reduce the absolute pressure difference between the interior and exterior of the device.

It is still another object of the present invention to provide a pressure surge compensating device which includes check valves for permitting flow in either of two opposite directions at predetermined pressures.

It is still a further object of the present invention to maintain a flow of lubricant within an enlcosed volume formed by relatively moving parts with a seal therebetween wherein the flow of lubricant is through the seal in a direction towards an aggressive outer environment, whereby the seal life is prolonged by the application of lubricant and also by preventing flow of damaging substances in the aggressive environment towards the seal.

It is still a further object of the present invention to provide an improvement in a drill bit which incorporates all of the above objectives.

The present invention is directed to an automatic depth compensating system for controlling the pressure in a volume in response to pressure changes in the environment adjacent to the volume. The system comprises at least one pressure compensating means positioned between the volume and the environment for changing the pressure in the volume in response to changes in the environment and a pressure surge compensating device positioned between the volume and the environment for compensating for positive and negative pressure surges when the pressure in the volume changes relative to the pressure in the environment. The compensating device comprises a cylinder which includes a first bore having a first cross-sectional area and a second bore having a second cross-sectional area, the first and second bores being axially aligned. A first piston having a first head surface area is slidably positioned in the first bore and a second piston having a second head surface area is slidably positioned in the second bore. The first and second head surface areas are different and the first and second pistons are coupled together so that they move together. A spring is positioned in the second bore for applying a force to the second piston to bias the second piston in a direction towards the first bore. The spring provides a force which acts in concert with the force of the internal pressure on the second piston to thereby reduce the absolute pressure differential between the interior and exterior of the volume thereby enabling the device to operate under extreme external pressures. The surge compensating device comprises a cylinder and a piston in the cylinder for forming a chamber therein. A first check valve is positioned between the chamber and the volume with the first check valve opening to carry fluid from the chamber to the volume when the pressure in the volume is lower than the pressure in the chamber by a first predetermined amount. A second check valve is positioned between the chamber and the volume with the second check valve opening to carry fluid from the volume to the chamber when the pressure in the volume is higher than the pressure in the chamber by a second predetermined amount. The first predetermined pressure differential is less than the second predetermined pressure differential.

Still another important aspect of the present invention is the incorporation of the automatic depth compensating system seal lubricating device in downhole devices which operate in aggressive environments and furthermore, to incorporate the automatic depth compensating system and seal lubricating device as an improvement in a rotary drill bit having a solid cutting head such as, for example, in a Barnetche bit.

DETAILED DESCRIPTION OF THE PREFERRED EMBODIMENTS

Figure 1:
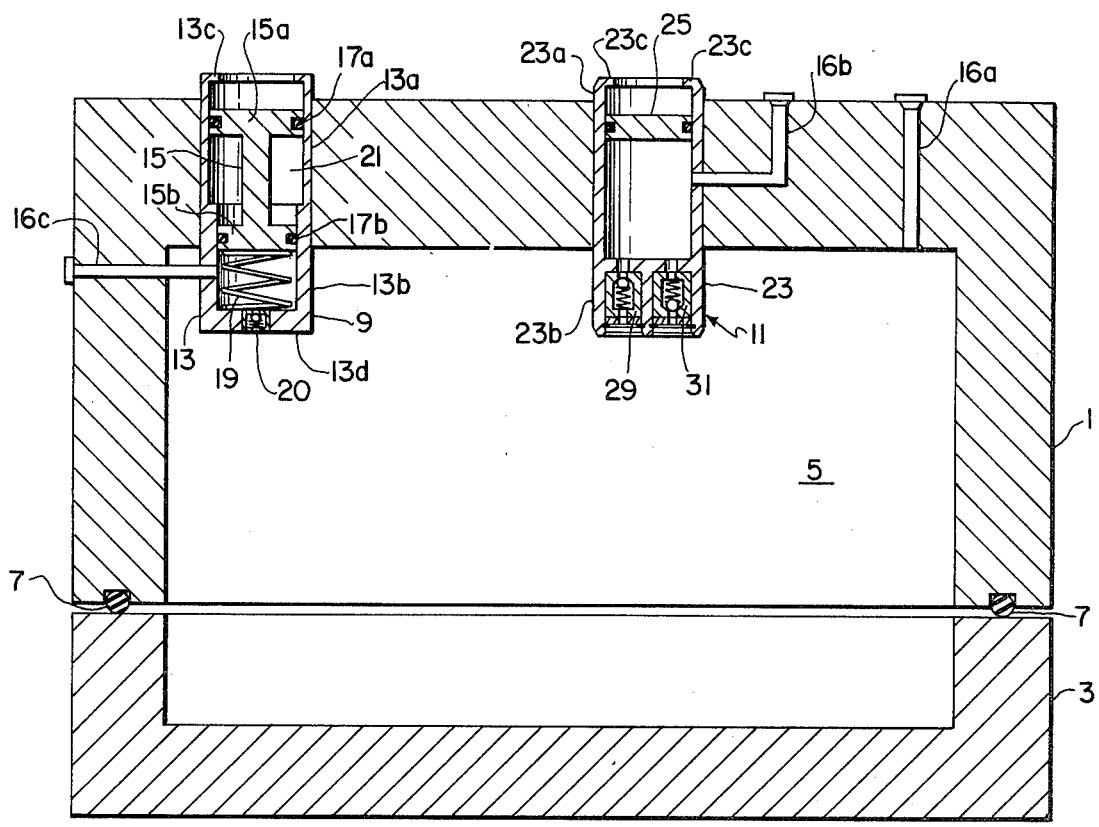
FIG. 1 is a cross-sectional view of a preferred embodiment of an automatic depth compensating system and seal lubricating device of the present invention.

FIG. 1 illustrates in diagrammatic form, an apparatus such as a downhole device which is formed from two parts, 1 and 3. the parts 1 and 3 enclose an interior space 5 which contains elements associated with the device (not shown), and a lubricant (not shown) is also contained within the volume or space 5 by means of a seal 7, such as an O-ring. The O-ring 7 seals the volume 5 from the surrounding environment which in a downhole situation is an aggressive or damaging environment. The pressure compensating system of the present invention includes a pressure compensating device 9 and a pressure surge compensating device 11. Lubricant is placed in the interior 5 through a valve 13.

Depth compensating device 9 is formed by a cylinder 13 having an upper portion 13a and a lower portion 13b. The upper portion 13a has a diameter da and the lower portion 13b has a diameter db which is less than da. A piston 15 is positioned within the cylinder 13, the piston 15 having an upper head portion 15a having a diameter da located within the upper portion of the cylinder 13a. The piston 15 has a second head portion 15b of a diameter db which is positioned within the lower portion of the cylinder 13b. Piston head 15a is sealed by means of an O-ring seal 17a and piston head 15b is sealed by means of an O-ring seal 17b. The face of the piston head 15a is exposed to the environment while the bottom face of the piston head 15b is exposed to the lubricant in the interior of the volume or space 5. The upper portion of the cylinder 13 has stops 13c which provide upper limits for the movement of the piston 15. Piston heads 15a and 15b are coupled by member 15c which has a cross-sectional area which is negligible with respect to the cross-sectional area of the piston heads. This avoids air compression in the space between the piston heads 15a and 15b. A helical spring 19 is positioned between the bottom face of piston head 15b and stops 13d of the cylinder 13. The spring 19 biases the piston 15 in the direction of upper portion 13a of the cylinder 13. A check valve 20 is placed in the bottom of pressure compensating device 9 to prevent movement of the piston 15 in response to a relatively small pressure decrease in the bore hole or increase in the interior space.

In operation, the interior space 5 is pre-filled with a lubricant and is at atmospheric pressure. The lubricant is held within the space 5 and is prevented from entering the space 21 between the upper and lower piston heads 15a and 15b by means of the seal 17b. Lubricant is added through inlets 16a, 16b and 16c until piston 15 is moved upwards and contacts stops 13c and piston 25 contacts stops 23c. This ensures proper filling of the space 5. After filling, inlets 16a, 16b and 16c are closed using a plug or similar device. As the device is lowered down a bore hole, for example, the space 21 between the piston heads 15a and 15b is sealed by means of seal 17a.

As the device progresses down a well increasing downhole pressure, PE acts on the piston head 15a to create a force Fa where $$Fa = PE \cdot \pi (da/2)^2 \qquad (1)$$

where da = the diameter of the piston 15a.

The force Fa is opposed by two forces; one, the force on piston head 15b as a result of the internal pressure within the space 5 and the other of the force of spring 19. The force from the internal pressure within the space 5 is $$Fb = PI \cdot \pi (db/2)^2 \qquad (2)$$

where db is the diameter of the piston head 15b.

The force of the spring is Fs.

Since PE is greater than the atmospheric pressure and db is less than da, Fa is greater than Fb and thus, ignoring the effect of friction, the piston will move away from the stop 13 towards the interior 5 and continue doing so until Fb increases due to compression of fluids in interior 5. The movement will continue until $$Fa = Fb + Fs \qquad (3)$$

Therefore, $$PE \cdot \pi (da/2)^2 = PI \cdot \pi (db/2)^2 + Fs \qquad (4)$$

$$PI = PE(da/db)^2 - Fs(2/db)^2 \cdot (1/\pi) \qquad (5)$$

$$PI = PE(da/db)^2 - k\, Fs \qquad (6)$$

As can be seen from the above equations, since $(da/db) > 1$, once the piston has moved from the stops 13 the internal pressure PI is always greater than the external pressure PE. Specifically, the internal pressure is greater than the external pressure by a factor equal to the square of the ratio of the diameter minus a number related to the spring force. It should be noted that the spring force Fs varies as a function of the compression of the spring.

As an example, if for a moment we ignore the force related to the spring force, then the external pressure will always be a constant percentage of the internal pressure. For example, if the square of the ratio of the diameters is $$(da/db)^2 = 1.11,$$

then the external pressure will always be 0.9 or 90% of the internal pressure. When the device is used in drilling such as well or water well drilling, the device may be used at great depths and the external pressure could be as high as 9,000 psi. The internal pressure would then be 10,000 psi. Although, there is compensation for changes in pressure, the absolute difference between the internal and external pressure in the above example is 1,000 psi. Thus, the seal 7 would be subjected to a pressure of over 1,000 psi. A pressure differential this great could result in a failure of the seal 7.

However, taking into consideration the force of the spring 19 in equation (6) above, it can be seen that the spring reduces the absolute pressure differential between the internal and external pressure for a particular external pressure. Thus, for any ratio of piston diameters greater depths can be achieved with the device without failure of the seal 7.

Pressure surge compensator 11 comprises a body member 23, the upper portion of which 23a forms a cylinder with a piston 25 therein. Space 27 below the piston is filled with a lubricant. The lower portion 23b of the body 23, has two check valves 29 and 31 therein.

When the pressure in chamber 27 resulting from the action of piston 25, the upper face of which is subjected to the external environment, exceeds a predetermined pressure, the force on ball 33 of check valve 29 exceeds the force of the spring 35 and fluid flows from spare 27 through the check valve in the direction of arrow 37, into the interior space 5 of the device. If the pressure in the interior space 5 exceeds that in the chamber 27 by a predetermined amount, then the force on ball 39 exceeds the force of spring 41 and check valve 31 is opened allowing fluid to flow from the interior of space 5 into chamber 27.

In operation, piston 15 will not begin movement until the drill bit reaches a certain depth and further the movement of piston 15 in pressure compensating device 9 is subjected to a large static frictional force as a result of the seals 17a and 17b. Thus, prior to initial movement and once the piston 15 has reached an equilibrium point and is subject to static friction because it has stopped its movement, a surge in pressure may not be compensated for because of the static friction force. In order to eliminate these problems, the pressure surge compensator 11 provides compensation by means of check valves 29 and 31 for both positive and negative pressure surges. The pressure which operates the check valves can be selected depending upon the system and operating conditions, however, typically, check valve 29 selected to open at about a 2 psi pressure differential and check valve 31 is selected to open at about a 50 psi pressure differential. Since the check valves are not subject to static frictional forces, surges in pressure will be automatically compensated for without the need to overcome the forces of static friction.

Figure 5:
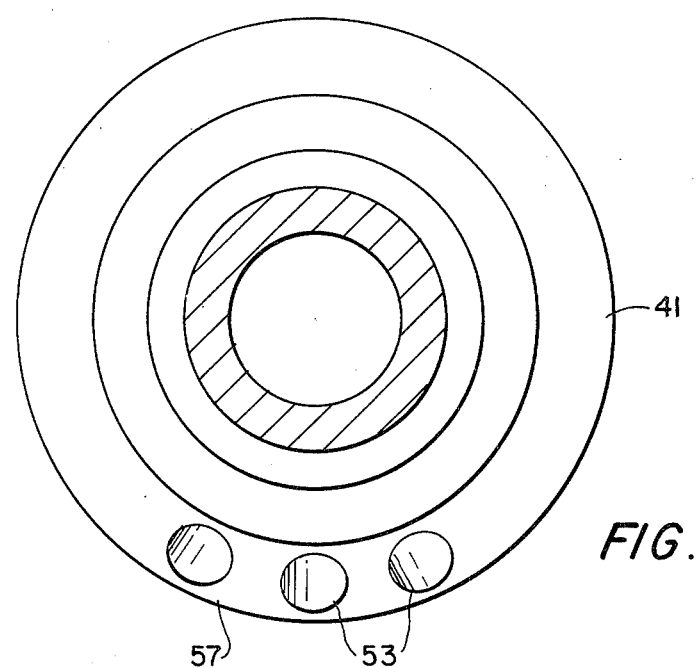
FIG. 5 is a plan view of the present invention incorporated into a solid cone rotary drill bit.
Figure 2:
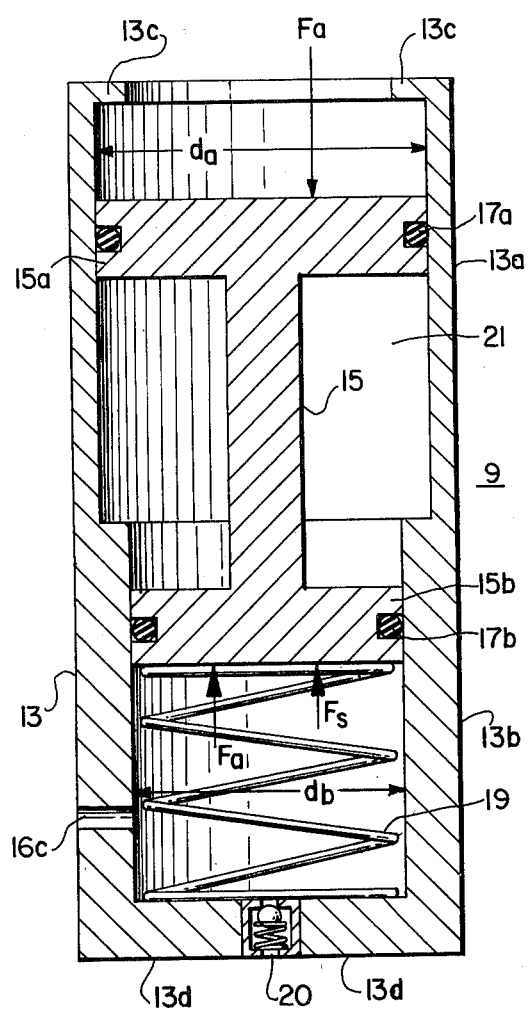
FIG. 2 is a cross-sectional view of a depth compensating device of the present invention.
Figure 3:
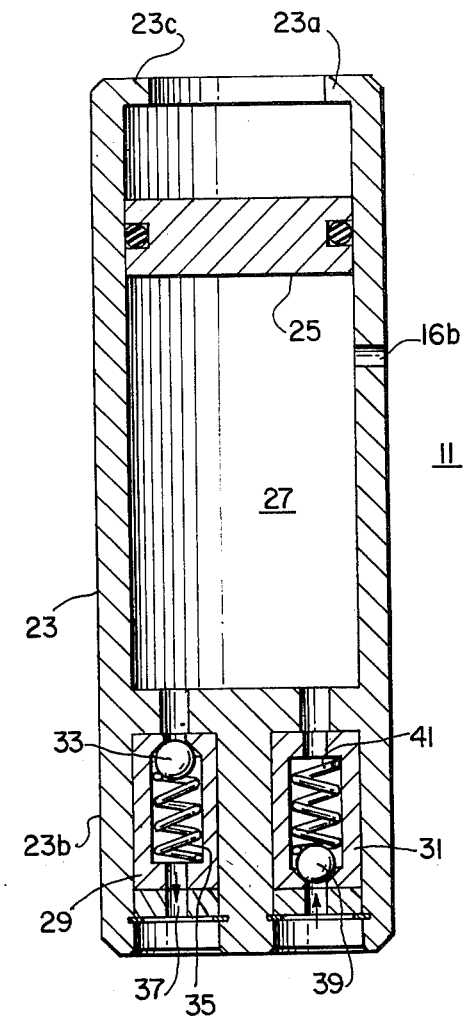
FIG. 3 is a cross-sectional view of a pressure surge compensating device of the present invention.
Figure 4:
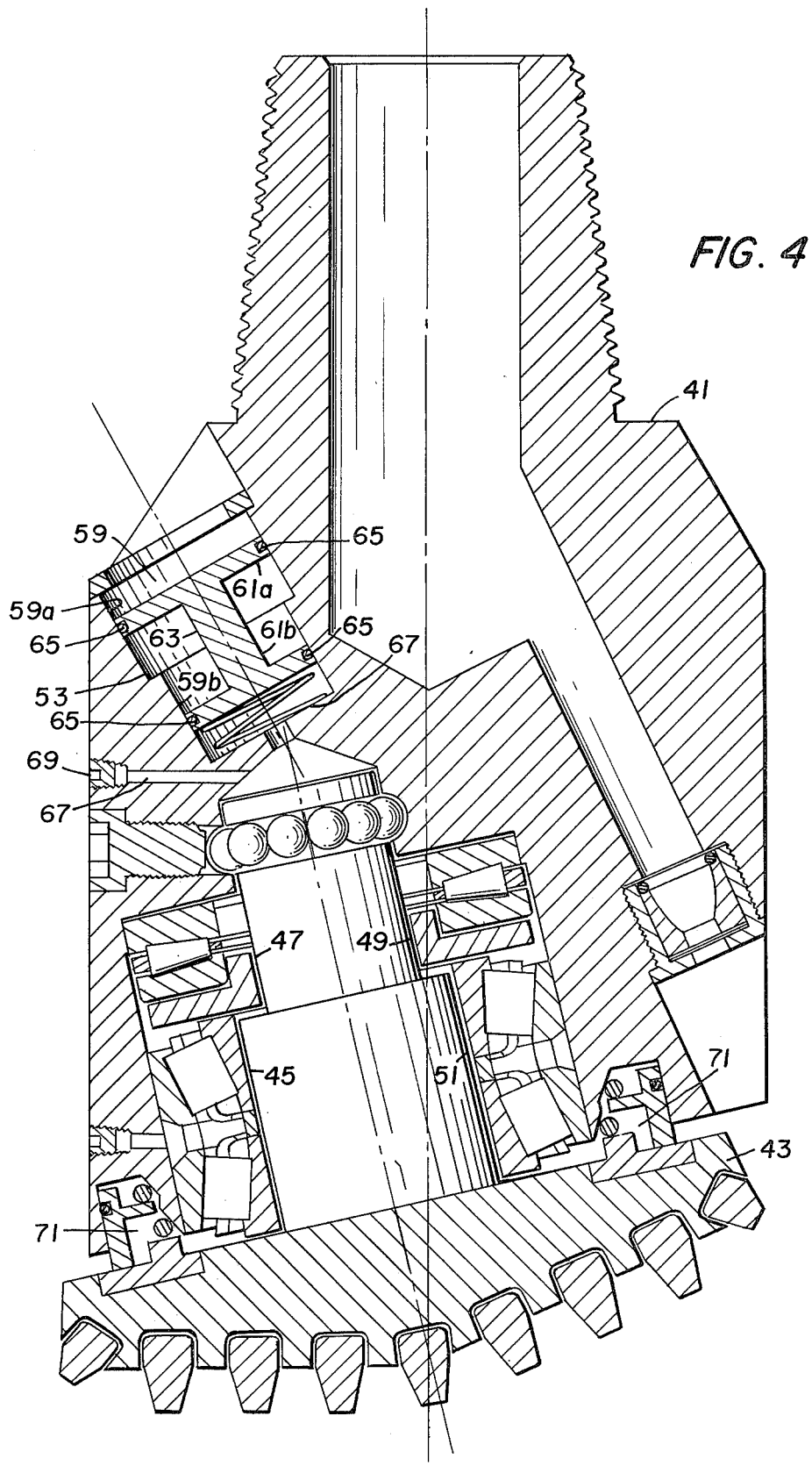
FIG. 4 is a cross-sectional view of the present invention in a solid cone rotary drill bit.

Referring to FIGS. 4 and 5, a pressure compensating and seal lubricating device is illustrated in use with a rotary drill having a solid conical cutting head similar to that shown in U.S. Pat. No. 4,154,312. The drill bit comprises a body 41 and a cutting head or cone 43 rotatably mounted therein. The cutting head 43 is supported in the body 41 by means of bearings 45, 47, 49 and 51. Pressure compensating devices 53 are positioned in the upper part of the body 41 circumferentially spaced from one another. Pressure surge compensating device 55 is positioned adjacent the pressure compensating devices 53. The pressure compensating devices 53, which is shown in FIG. 4 comprises a cylinder 59 having a first bore 59a and a second bore 59b. A first piston head 61a is positioned in bore 59a and a second piston head 61b is positioned in bore 59b, the piston heads 61a and 61b being rigidly connected to each other by a connector 63. This differential piston device can, of course, be a single integral element as illustrated. Seals 65 form a seal between the piston heads and the cylinder. A spring 67 biases the piston 1 in a direction towards bore 59a of the cylinder 59. A lubricant is added to the interior of the drill bit body 41 through channel 67 after removing plug 69. This lubricant lubricates the bearing structure, retaining structure and seals generally indicated at 71. The pressure compensation and seal lubrication is accomplished in the manner described above with respect to the previously discussed embodiments. The pressure surge compensating device 57 is of the type illustrated in FIG. 3 with the check valves 29 and 31 facing the interior of the drill bit body 41.

Each pressure compensating device 53 has a particular pressure differential at which it initially begins movement and at which it can move no further. The point of initial movement is a function of the diameters da and db, the force of static friction and the force of the spring 19. The point at which it can move no further is when the spring 19 is fully compressed. The parameters, that is the diameters da and db and the spring 19 can be selected so that the piston operates in a particular range of pressure differentials. By selecting different characteristics for each of the pressure compensating devices 53, the range of operation can be extended. For example, one pressure compensating device 53 may operate in a range of 500–1,000 psi while a second pressure compensating device may operate in a range of 1,000–2,000 psi. The overall range of operation is then 500–2,000 psi. Furthermore, if it is found that because of the operating conditions it is necessary to force larger amounts of lubricant through the seals, the volume of lubricant available can be increased by increasing the number of pressure compensating devices. In this situation, all of the pressure compensating devices may operate over the same pressure range but the volume of lubricant available will be increased because the number of pistons is increased. Furthermore, more than two pressure compensating devices can be used in order to both expand the range and expand the volume of lubricant displaced by the pistons.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A depth compensation system for controlling the pressure in a volume in response to pressure changes in the environment adjacent to said volume said system comprising:
   (a) at least one pressure compensating means, positioned between said volume and the environment, for changing the pressure in said volume in response to pressure changes in the environment, and
   (b) a pressure surge compensating means, positioned between said volume and the environment, for compensating for positive and negative pressure surges when the pressure in said volume changes relative to the pressure in the environment, said pressure surge compensating means comprising:
   (i) a cylinder extending between said volume and the environment;
   (ii) a piston positioned in said cylinder and forming a chamber therein;
   (iii) a first check valve positioned between said chamber and said volume said first check valve opening to carry fluid from said chamber to said volume when the pressure in said volume is lower than the pressure in said chamber by a first predetermined amount; and
   (iv) a second check valve positioned between said chamber and said volume, said second check valve opening to carry fluid from said volume to said chamber when the pressure in said volume is higher than the pressure in said chamber by a second predetermined amount.

2. A depth compensation system as set forth in claim 1 wherein said pressure compensating means comprises:
   (a) a cylinder, said cylinder including a first bore having a first cross-sectional area and a second bore having a second cross-sectional area, said first and second bores being axially aligned;
   (b) first piston means having a first head surface area, said first piston means being slidably positioned in said first bore;
   (c) second piston means having a second head surface area, said second piston means being slidably positioned in said second bore, wherein said first and second head surface areas are different; and
   (d) coupling means for rigidly coupling said first and second piston means, wherein said first and second piston means move together.

3. A depth compensating device as set forth in claim 2 wherein the cross-sectional area of said coupling means is negligible with respect to the cross-sectional area of the first and second head surface areas.

4. A depth compensation system as set forth in claim 2 including spring means, positioned in said second bore, for applying a force to said second piston means to bias said second piston means in a direction towards said first bore.

5. A depth compensation system is set forth in claim 1 wherein said at least one pressure compensating means is two pressure compensating means.

6. A depth compensation system as set forth in claim 4 wherein said first piston means, said second piston means and said coupling means are integral.

7. A depth compensation system as set forth in claim 1 wherein said first predetermined pressure is less than said second predetermined pressure.

8. A self lubricating sealed apparatus, said apparatus comprising:
   (a) a first member;

(b) a second member rotatable relative to said second member;

(c) seal means positioned between said first and second members, said first and second members defining a space, said space being sealed from an external environment by said seal means;

(d) at least one pressure compensating means mounted on said first member, said pressure compensating means comprising:

(i) a first cylinder having a bore therein having a first cross-sectional area;

(ii) a second cylinder having a bore therein having a second cross-sectional area;

(iii) a piston means having a first head means slidably positioned in said first cylinder and exposed to said environment and a second head slidably positioned in said second cylinder and exposed to said space wherein said first and second heads are rigidly fixed to each other and wherein the surface area of said first head differs from that of the surface area of said second head;

wherein the pressure in said environment against said first head means and the pressure in said space against said second head means causes the movement of said piston means in said first and second cylinders such that said pressure compensating means maintains the pressure in said space proportional to and greater than the pressure in said environment whereby lubricant in said space is forced into said environment around said seal means; and (e) pressure surge compensation means for compensating for positive or negative pressure surges within said apparatus, said pressure surge compensating means comprising:

(i) a cylinder;

(ii) a piston positioned in said cylinder and forming a chamber therein;

(iii) a first check valve positioned between said chamber and said space said first check valve opening to carry fluid from said chamber to said space when the pressure in said space is lower than the pressure in said chamber by a first predetermined amount; and (iv) a second check valve positioned between said chamber and said space, said second check valve opening to carry fluid from said space to said chamber when the pressure in said space is higher than the pressure in said chamber by a second predetermined amount.

9. A self lubricating sealed apparatus, as set forth in claim 8 including coupling means for rigidly fixing said first and second heads, wherein the cross-sectional area of said coupling means is negligible with respect to the cross-sectional area of said first and second heads.

10. A self lubricating sealed apparatus as set forth in claim 8 wherein said first predetermined pressure is less than said second predetermined pressure.

11. A self lubricating sealed apparatus as set forth in claim 8 wherein said at least one pressure compensating means is at least two pressure compensating means.

12. A self lubricating sealed apparatus as set forth in any one of claims 8, 10 or 11 further including biasing means for biasing said piston means towards said first cylinder.

13. A self lubricating sealed apparatus as set forth in claim 10 wherein said biasing means is a spring.

14. In a rotary drill bit for drilling a well in the surface of the earth, said drill comprising:

(a) a drill bit including a body portion for connection to a drill string, duct means including a fluid outlet directed into the well for carrying fluid to extract detritus and clean the bottom of the well and a receiving means;

(b) a cutting head comprising a conical head portion and a unitary stem portion said conical head portion including holes therein and cutting elements inserted in said holes, said stem portion being received in said receiving means of said drill bit, wherein said stem and said receiving means include holding means for rotatably holding said cutting head in said drill bit;

(c) bearing means between said drill bit and said conical head; and (d) a lubricating system, interconnected between said drill bit and said cutting head said lubricating system including a compensating system for regulating the pressure in the lubricating system in response to the pressure in the bore hole surrounding the bit, the improvement wherein said compensating system comprises:

(e) at least one pressure compensating means for regulating the pressure in the lubrication system in response to the pressure in the bore hole surrounding the bit; and (f) pressure surge compensating means for compensating for positive and negative pressure surges within said drill bit, said pressure surge compensating means comprising:

(i) a cylinder mounted in said drill bit body;

(ii) a piston in said cylinder, said cylinder walls and said piston head forming a chamber;

(iii) a first check valve positioned between said chamber and the interior of said drill bit, said first check valve opening to carry fluid from said chamber to the interior of said drill bit when the pressure in said drill bit is lower than the pressure in said chamber by a first predetermined amount; and (iv) a second check valve positioned between said chamber and the interior of said drill bit, said second check valve opening to carry fluid from said chamber to the interior of said drill bit to said chamber, when the pressure in said drill bit is higher than the pressure in said chamber by a second predetermined amount.

15. A rotary drill bit as set forth in claim 14 wherein said first predetermined pressure is less than said second predetermined pressure.

16. A rotary drill bit as set forth in any one of claims 14 or 15 wherein said pressure compensating means comprises:

(a) a cylinder mounted in said drill bit body, said cylinder including a first bore having a first cross-sectional area and a second bore having a second cross-sectional area, and first and second bores being axially aligned;

(b) first piston means having a first head surface area said first piston means being slidably positioned in said first bore;

(c) second piston means having a second head surface area, said second piston means being slidably positioned in said second bore wherein the area of said first and second head surface areas are different;

(d) coupling means for rigidly coupling said first and second piston means, wherein said first and second piston means move together; and (e) biasing means for biasing said second piston means towards said first bore.

17. A rotary drill bit as set forth in claim 16 wherein said biasing means is a spring positioned in said second bore.

18. A rotary drill bit as set forth in claim 16 wherein the cross-sectional area of said coupling means is negligible with respect to the cross-sectional area of said first and second head surface areas.

* * * * *